Aug. 29, 1967  A. DI SETTEMBRINI  3,338,998

METHOD OF MANUFACTURING HOLLOW THERMOPLASTIC ARTICLES

Filed July 1, 1964

United States Patent Office 3,338,998
Patented Aug. 29, 1967

3,338,998
METHOD OF MANUFACTURING HOLLOW THERMOPLASTIC ARTICLES
Antoine Di Settembrini, 42 Residence du Petit Val, Sucy-en-Brie, France
Filed July 1, 1964, Ser. No. 379,517
Claims priority, application France, May 25, 1964, 975,714, Patent 1,405,298
1 Claim. (Cl. 264—94)

This invention relates to the manufacture of hollow thermoplastic articles, for example articles made from polyvinyl chloride referred to as PVC further on, polyethylene or any other similar material, and has specific reference to similar manufacturing methods wherein a tubular blank is introduced in the plastic state into a mold closed at one end, this blank being subsequently expanded by inflating same with a fluid under pressure. This invention provides an improved method of this general character wherein there is formed in the blank to be expanded an orifice other than that through which the gaseous fluid causing the expansion is introduced, said other orifice being located at the open end of the blank of which the lips have been clamped together, whereby a circulation of expanding fluid from inside to outside the blank takes place during the expansion step. By virtue of this fluid circulation on the one hand the molded article is cooled at a faster rate and on the other hand the gases released during the expansion are rapidly exhausted to the outside; as a result the manufacturing cycle can be accelerated considerably.

Other features and advantages of this invention will appear as the following description proceeds with reference to the specific form of embodiment of the invention illustrated in the attached drawing by way of example.

Figure 1:
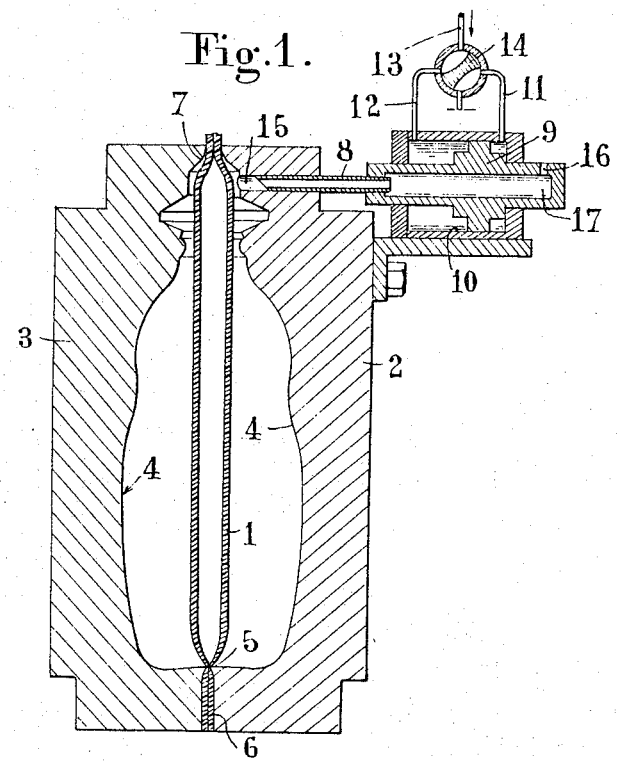
Figure 2:
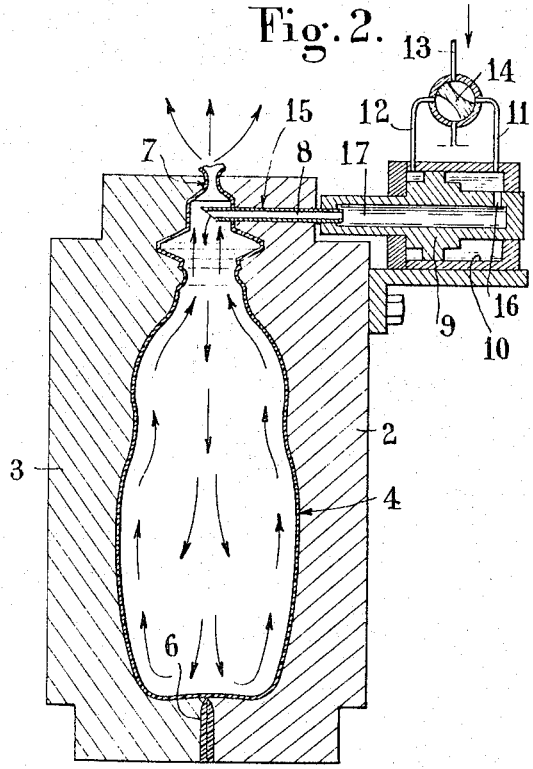
Figure 3:
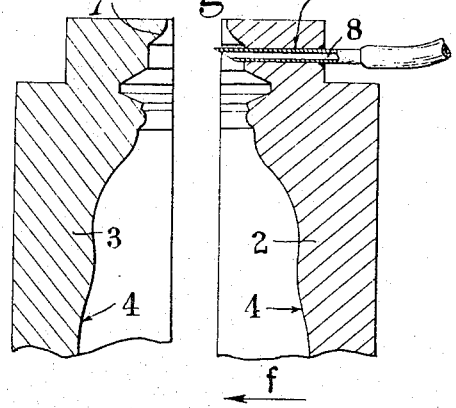

In the drawing:
FIGURE 1 is a diagrammatic axial section showing the mold in its closed position, with the blank enclosed therein and ready to be inflated;
FIGURE 2 is a similar view taken during the inflating;
FIGURE 3 illustrates a modified form of embodiment of the needle.

The mold illustrated in the drawing is designed for manufacturing a thermoplastic container such as a PVC bottle. By using known means a tubular blank or parison 1 is formed in a machine (not shown). When the parison length corresponding to the mold height is formed it is cut off and introduced in the plastic state into the mold made of two halves or shells 2, 3 having a symmetric joint and a molding impression or cavity 4 corresponding to the shape of the container to be formed. The two mold halves are movable in relation to each other and means (not shown) are provided for opening and closing the mold as required during the molding process.

At the portion to be closed the mold cavity has a sharp edge 5 followed by a shallow recess 6 adapted to clamp the corresponding end of the parison 1 so as to seal same by heat-and-pressure welding. At the opposite end of the two mold halves a rounded edge 7 is formed for the purpose of bringing the edges of the parison wall together towards the mold axis when the mold is closed, so as to narrow the upper aperture of the parison but to such a degree that considering the thickness of the parison wall the edges are simply moved towards each other and caused to substantially contact each other, without producing any sealing or welding effect therebetween.

On one of the mold halves, for example the right-hand shell 2, a blowing or inflating device is secured which comprises a hollow or tubular punch or needle 8 mounted on the end of a double-acting hollow piston 9, the interior of the punch communicating with the piston cavity, as shown. This piston 9 is slidably mounted in a cylinder 10 and responsive to a gaseous fluid under pressure, such as compressed air, fed alternatively to one or the other end of the cylinder by means of ducts 11, 12 connected to a source of compressed air through a feed line 13 and a control valve 14, whereby the compressed air may be delivered at will to one or the other side of the piston, the opposite side being connected automatically to the exhaust. The punch 8 is slidably fitted in a transverse orifice or bore 15 formed through the wall of the mold half 2 and can thus penetrate into the impression or cavity 1. This punch 8 may have two positions, namely a retracted position (FIGURE 1) in which the left-hand chamber of cylinder 10 is pressurized, and an operative position (FIGURE 2) in which compressed air is fed to the right-hand chamber while the left-hand chamber is exhausted. In this operative position the punch 8 is driven into the mold cavity and perforates the parison wall.

Moreover, the arrangement comprises an orifice 16 through which the inner chamber 17 of piston 9 can communicate with the right-hand chamber of cylinder 10 so as to introduce compressed air into the hollow punch 8 when the latter is in its operative position.

The device described hereinabove operates as follows:
A parison of a length consistent with the mold height is introduced into the open mold, the punch 8 being in its retracted position, and the mold is subsequently reclosed. The lower or bottom portion of the parison which is to be sealed or closed is clamped and has its edges or lips welded together while at the opposite end the edges or lips of the parison wall are just brought together so as to be substantially in mutual contact. The diameter of the upper mold orifice varies as a function of the thickness and nature of the specific type of parison used.

By way of example, a one-liter PVC bottle having a 230-mm. height and weighing 35 grams with a standard neck having a 29-mm. diameter can be manufactured by leaving a 2-mm. orifice.

Inflating a polyethylene bottle having a capacity of ⅓ of a liter and a height of 150 mm., and weighing 30 grams, requires an 8-mm. orifice for a 25-mm. neck diameter.

Then compressed air is fed through the duct 11 and the punch 8 driven by the piston 9 is moved to the left as seen in the figure, thus penetrating into the mold and perforating the parison wall. In this punch position compressed air flows through orifice 16, then through the inner cavity of needle 8 and finally into the parison or blank 1, thus expanding same until its walls are pressed against the inner walls 4 of the mold cavity. At the same time, due to the action exerted by the compressed air the edges of the upper constriction formed in the upper portion of the parison, which had only been moved towards each other, expand slightly to permit the venting or release of compressed air to the outside. This venting is attended on the other hand by a certain throttling of the parison material and by a reduction in the wall thickness, thus contributing in increasing the dimensions of the exhaust orifice and permitting the escape of air. As a result, during the expansion period the air circulates freely through the expanded blank along the path shown by the arrows in FIGURE 2, so that the interior of the article is sufficiently ventilated and cooled. It will be noted that, considering the dimensions of this exhaust orifice and the dimensions of the article to be molded, the compressed air must be supplied at a value such that in spite of the leakage caused by this orifice 7 there remains a sufficient pressure in the parison or blank to expand same and produce the molding pressure necessary for applying the parison wall against the mold wall.

By way of example, in the case of a bottle having a capacity of the order of one liter, and assuming that the exhaust orifice has a diameter of the order of 2 mm., the compressed air is introduced under a pressure of about 70 to 115 p.s.i.

This strong air circulation is attended by a twofold advantage:

On the one hand, the continuous delivery of fresh air promotes the dissipation of heat, thus accelerating the cooling of the molded article which can be stripped very rapidly. As a result, the rate of manufacture may be accelerated considerably, for example as much as 10 percent.

On the other hand, the gases released by the article during the expansion and cooling periods are easily and rapidly exhausted from the interior of the article, thus ensuring an efficient ventilation therein. Consequently, in the case of the manufacture of thermoplastic bottles to be subsequently filled with a sensitive product, the filling operation may take place without any loss of time immediately after the bottle has been stripped from the mold, since it is no more necessary to wait until the gases are dissipated completely from the bottle after the stripping step. It will be noted that the position of this exhaust orifice corresponds to the thickest portion of the blank, that is, the neck in the case of a bottle; this arrangement is particularly advantageous since it is at this end of the bottle that the most effective cooling action is required.

Although in the example illustrated the use of compressed air is contemplated for inflating and ventilating the interior of the bottle, it is obvious that any other compressed gas may be used, if desired. Thus, more particularly, it may be advantageous in the case of containers to be filled subsequently with food products to introduce at the end of the inflating step a sterile or inert gas for completing the ventilation of the container.

In the specific form of embodiment illustrated in the drawing and described hereinabove, the perforating device consists of a hollow punch 8, but anybody skilled in the art will readily understand that its dimensions should be adapted to those of the object or article to be molded and also to the pressure of the compressed fluid to be introduced; on the other hand, a hollow needle or like slender member may be substituted for the punch illustrated. Besides, the perforating device, instead of being movable in its axial direction, may be stationary and rigid with one of the mold halves so as to project into the mold cavity, as shown diagrammatically in FIGURE 3. In this case the punch or needle 8 is mounted preferably on the right-hand mold half 2, that is, the one to which the movement towards the other mold half 1 considered as stationary is impressed, as shown by the arrow f.

In an alternate form of embodiment, the parison or blank may be inflated through the open orifice 7, a venting orifice being formed at any such position that will not interfere with the use of the final article, such as the upper portion of the blank, above the neck, if the article to be inflated is a bottle.

Of course, this invention should not be construed as being limited by the specific forms of embodiment shown, described or suggested herein, since it is applicable not only to the manufacture of containers such as bottles but also to the manufacturer of any other hollow article or object, and furthermore many modifications and alterations may be brought to these forms of embodiment without departing from the spirit and scope of the invention as set forth in the appended claim.

What I claim is:

A method of manufacturing hollow articles of thermoplastic materials, which comprises the steps of introducing a tubular blank in the plastic state into a hollow mold, closing and sealing one end of said blank by heat and pressure welding, narrowing the aperture of its other end, and expanding said blank by introducing into said blank a fluid under a pressure sufficient to expand said blank in said mold in spite of the leakage caused by the narrowed aperture of the blank, wherein the fluid is introduced in the blank through a hollow needle which perforates the blank wall, and the narrowed aperture of the blank is narrowed to such a degree that, considering the thickness of the blank wall, the edges are simply moved towards each other and caused to substantially contact each other, without producing any sealing or welding effect therebetween.

References Cited

UNITED STATES PATENTS 2,903,740  9/1959  Parfrey.
3,114,931  12/1963  Pelikan _____ 264—98

ROBERT F. WHITE, *Primary Examiner.*

A. R. NOE, *Assistant Examiner.*